Sept. 19, 1939.   W. R. GERHARDT   2,173,106
PERISCOPE
Filed May 9, 1938
Fig-1-
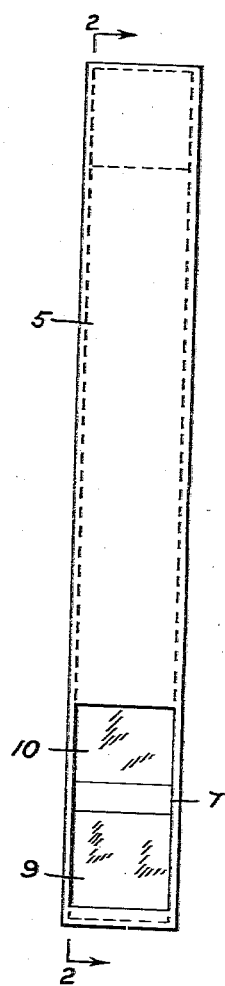
Fig-2-
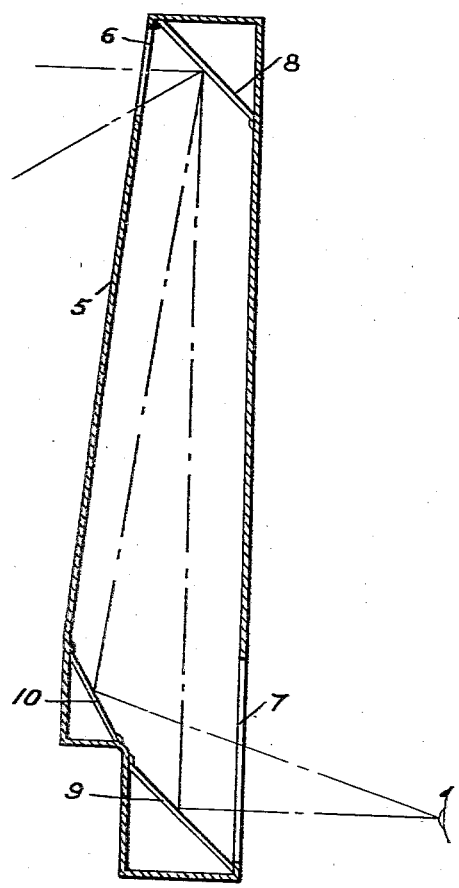
Inventor
William R. Gerhardt
By Kessenich
Attorney Patented Sept. 19, 1939

2,173,106

UNITED STATES PATENT OFFICE 2,173,106

PERISCOPE

William R. Gerhardt, Martinsburg, W. Va.

Application May 9, 1938, Serial No. 206,965

1 Claim. (Cl. 88—68)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a periscope.

The purpose of this invention is to provide a periscope having two optical systems with a common element whereby an observer may see the general field of view and also the immediate foreground.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in rear elevation of a periscope constructed in accordance with the invention;

Fig. 2 is a sectional view on the line 2—2 of Fig. 1.

Referring to the drawing by characters of reference the periscope comprises a casing 5 having at opposite ends and at opposite sides a light receiving opening 6 and a light emerging or viewing opening 7. A pair of spaced parallel mirrors 8 and 9 respectively disposed in front of the openings 6 and 7 are of the usual forty-five degree arrangement for displacing the axis of the image.

A third mirror 10, positioned between the mirrors 8 and 9 and out of line therewith, is out of parallelism with the mirror 8. The mirror 10 receives reflections from the mirror 8 of the immediate foreground and reflects light rays through the opening 7 on a path that intersects the path of the rays reflected by the mirror 9 at a point close to the mirror 9 so that the observer without changing position may view both mirrors 9 and 10.

I claim:

In a periscope in combination, a casing adapted to normally be disposed in a vertical position and having a light entrance aperture at its upper end on one side and a light exit aperture at its lower end on an opposite side, a plane entrance reflector disposed within the casing in back of the entrance aperture with its reflecting surface exposed to view through said entrance aperture and inclined at an angle of substantially forty-five degrees with the horizontal, a plane exit reflector disposed within the casing in back of the exit aperture vertically below the entrance reflector with its reflecting surface confronting and parallel with the entrance reflecting surface and in vertical alignment therewith and a third plane reflector disposed within the casing in back of the exit aperture and above said exit reflector and offset laterally therefrom with its reflecting surface confronting the reflecting surface of the entrance reflector and so inclined relative thereto as to receive reflections therefrom of the immediate foreground and reflect them on a path that intersects the path of rays reflected by the exit reflector at a point close to the latter.

WILLIAM R. GERHARDT.